United States Patent [19]

Kano et al.

[11] Patent Number: 4,963,751

[45] Date of Patent: Oct. 16, 1990

[54] RADIATION IMAGE STORAGE PANEL AND METHOD FOR PREPARING THE SAME

[75] Inventors: Akiko Kano; Hisanori Tsuchino; Kuniaki Nakano; Fumio Shimada; Satoshi Honda, all of Hino, Japan

[73] Assignee: Konica Corporation, Tokyo, Japan

[21] Appl. No.: 228,250

[22] Filed: Aug. 4, 1988

[30] Foreign Application Priority Data

Aug. 17, 1987 [JP] Japan ................................ 62-204909
Jun. 13, 1988 [JP] Japan ................................ 63-143638

[51] Int. Cl.$^5$ ............................................. G03B 42/00

[52] U.S. Cl. ............................... 250/484.1; 250/488.1; 427/34; 427/68; 427/423

[58] Field of Search .................. 250/484.1, 488.1, 488; 427/34, 68, 423

[56] References Cited

U.S. PATENT DOCUMENTS

| | | | |
|---|---|---|---|
| 3,859,527 | 1/1975 | Luckey | 250/327.2 |
| 3,904,905 | 9/1975 | Watanabe et al. | 427/68 |
| 4,510,174 | 4/1985 | Holzapfel et al. | 250/484.1 A |
| 4,517,224 | 5/1985 | Ditty | 427/68 |
| 4,741,993 | 5/1988 | Kano et al. | 250/448.1 |

*Primary Examiner*—Constantine Hannaher
*Assistant Examiner*—Jacob M. Eisenberg
*Attorney, Agent, or Firm*—Frishauf, Holtz, Goodman & Woodward

[57] ABSTRACT

Disclosed is a radiation image storage panel, which comprises a support, a flame-sprayed layer and a stimulable phosphor layer formed by a vapor phase build-in method in succession and method for preparing the same. According to this invention, radiation images which are high in radiation sensitivity and sharpness can be obtained.

12 Claims, 8 Drawing Sheets

PRIOR ART

PRIOR ART

RADIATION IMAGE STORAGE PANEL AND METHOD FOR PREPARING THE SAME

BACKGROUND OF THE INVENTION

This invention relates to a radiation image storage panel having a stimulable phosphor layer, in particular, a radiation image storage panel that can provide radiation images which are high in radiation sensitivity and sharpness and a method for preparing the same.

Radiation images like X-ray images are often used in diagnosis of diseases. For obtaining the X-ray images, there has been employed so-called radiation photography in which X-ray transmitted through a subject is irradiated on a phosphor layer (fluorescent screen), visible light thereby generated is irradiated on a film using silver salt in the same manner as in conventional photography, and the film is then developed. However, in recent years, methods of directly taking out images from phosphor layer have been devised to replace methods using film coated with silver salts.

The methods include, for example, a method in which the radiation (generally X-ray) transmitted through a subject is absorbed by a phosphor, and thereafter this phosphor is excited by light or heat energy to bring the radiation energy accumulated by being absorbed as mentioned above to radiate as fluorescence, which fluorescence is detected and formed into an image. Specifically, U.S. Pat. No. 3,859,527 and Japanese Unexamined Patent Publication No. 12144/1980 disclose radiation image storage methods in which a stimulable phosphor is used and visible light or infrared rays are used as stimulating light. This method employs a radiation image storage panel (hereinafter referred to as "storage panel") comprising a support formed thereon with a stimulable phosphor layer (hereinafter referred to simply as "stimulable layer"), where radiation transmitted through a subject is applied to the stimulable layer to accumulate radiation energy corresponding to the radiation transmission degree of all areas of the subject to form a latent image. Thereafter this stimulable layer is scanned with the stimulating light to bring the radiation energy accumulated in the areas to radiate to convert this into light, thus obtaining an image according to signals based on the strength of this light. The image finally obtained may be reproduced as a hard copy, or may be reproduced on a CRT.

The storage panel having the stimulable layer used in this radiation image storage method is required to provide images with good graininess and high sharpness, in addition to high precision in radiation absorption and light conversion (including both, herein called "radiation sensitivity").

However, in general, the storage panels having the stimulable layer are prepared by coating on a support or a protective layer a dispersion containing a particulate stimulable phosphor having a particle diameter of about 1 to 30 μm and an organic binder, followed by drying, resulting in a low charge density of the stimulable phosphor (charge weight: 50%), so that the phosphor layer must be made to have a large thickness to achieve sufficiently high radiation sensitivity.

According to one example, when the layer thickness of the stimulable phosphor layer is 200 μm, the coating amount of the stimulable phosphor is 50 $mg/cm^2$. The radiation sensitivity is increased directly until the layer thickness of the stimulable phosphor layer becomes 350 μm, and is saturated above 450 μm.

In this regard, the reason why the radiation sensitivity is saturated is that stimulated emission inside the stimulable phosphor layer does not pass outside, because the scattering of the stimulated emission between the stimulable phosphor particles occurs when the stimulable phosphor layer becomes excessively thick.

On the other hand, the sharpness of the image in the above radiation image storage method has a tendency to be higher with decreased thickness of the stimulable layer of a storage panel, so that the phosphor layer must be made thinner to improve the sharpness.

Also, the graininess of the image in the above radiation image storage method depends on the spatial fluctuation of radiation quantum number (i.e. quantum mottles) or the structural disorder of the stimulable layer of a storage panel (i.e. structure mottles), so that making the layer thickness of the stimulable layer smaller brings about a decrease in the radiation quantum number to be absorbed in the stimulable layer to increase the quantum mottles. Alternatively, structural disorders are actualized to cause a lowering of image quality. Thus, the phosphor layer must be made to have a large thickness to improve the graininess of images.

In other words, in the conventional panels, the sensitivity to radiation and the graininess of images show quite opposite tendencies to the sharpness of images with respect to the layer thickness of the stimulable layer. Accordingly, it has been necessary to balance sensitivity to radiation against graininess and sharpness of the image.

Incidentally, as well known the sharpness of images in the conventional radiography depends on the extent of the momentary emission (emission at the time of irradiation of radiations) of the phosphor present in a fluorescent screen. In contrast therewith, however, the sharpness of images in the radiation image storage method utilizing the above-mentioned stimulable phosphor does not depend on the extent of stimulated emission of the stimulable phosphor present in the storage panel, namely, it does not depend on the extent of the emission of the phosphor as shown in the radiography method, but depends on the extent of the stimulating light in said storage panel. The reason why is as follows. In the radiation image storage method, the radiation images accumulated in the storage panel are taken in time series, and, accordingly, all of the stimulated emission generated by the stimulating light irradiated in a certain period (ti) are desirably collected and recorded as an output from a certain picture element (xi, yi) on the storage panel from which the stimulating light was irradiated. However, if the stimulating light is extended in said panel due to, for example, scattering, etc., the extended stimulating light also stimulates the stimulable phosphors present outside the irradiated picture element (xi, yi), so that recorded information output from the picture element (xi, yi) include outputs from a broader area than the picture element (xi, yi). Therefore, if the stimulated emission generated by the stimulating light irradiated at a certain time (ti) is comprised only of the emission from picture elements (xi, yi) on said panel on which the stimulating light had been actually irradiated at the time (ti), the emission, whatever extent it has, does not affect the sharpness of the resulting image.

From such a viewpoint, there have been proposed several methods for improving the sharpness of radiation images.

They are exemplified by a method in which a white powder is mixed into the stimulable phosphor layer of a radiation image storage panel as described in Japanese Unexamined Patent Publication No. 146447/1980, and a method in which a radiation image storage panel is so colored that the average reflectance at the stimulating excitation wavelength region of a stimulable phosphor may become smaller than the average reflectance at the stimulated emission wavelength region of said stimulable phosphor as described in Japanese Unexamined Patent Publication No. 163500/1980.

These methods, however, necessarily result in an extreme lowering of the sensitivity if the sharpness is improved, and can not be said to be preferable methods.

On the contrary, the present inventors have already proposed, in Japanese Unexamined Patent Publication No. 73100/1986, a novel storage panel containing no binder by which the above-mentioned conventional disadvantages in the storage panels using the stimulable phosphors are improved. According thereto, the stimulable layer of the above storage panel contains no binder, so that the charge ratio of the stimulable phosphor in the stimulable layer can be remarkably improved and also the directivity of the stimulating light and stimulated emission of the stimulable layer can be improved, resulting in improvement in the sensitivity to radiation of the storage panel and the graininess of images, and at the same time improvement in the sharpness of images.

The stimulable layer of the storage panels proposed in the above-mentioned publications can be prepared by the vapor phase build-up methods such as vapor deposition and sputtering.

Performances necessary for a support of the storage panel are excellent mechanical properties and planarity or a property maintaining a rigidly planar state, chemically inert and opaque to the stimulating light and the stimulated emission. Further, in the case of forming the phosphor layer by use of vapor-phase build-up method, heat-resistance is important for preventing deformation due to heating which is applied during vapor phase build-up or annealing treatment after the vapor phase build-up. The opaqueness of the support is important, because, if the support is transparent, incident stimulating light or stimulated emission transmit through and pass outside from the support to lower the radiation sensitivity. Materials conventionally used as a support, for instance, those disclosed in Japanese Unexamined Patent Publication No. 99900/1986, such as plastic films, e.g., cellulose acetate film, polyester films and polyethyleneterephthalate film and papers, e.g., photographic base paper, resin-coated paper, barayta paper etc. are inferior in heat-resistance. Also, though quartz and chemical reinforced glasses have good planarity and also relatively excellent heat-resistance, they have high transparency, and are resultingly inappropriate to use as it is. Accordingly, those preferably used as the preferable support have been limited to opaque crystallized glasses and ceramic plates.

The present inventors have further proposed, in Japanese Unexamined Patent Publication No. 142497/1986, a storage panel having, on a support having a large number of fine concave-convex pattern on its surface, a stimulable layer comprising a fine pillar-shaped block structure which is grown on concave portions of the pattern. The pillar-shaped block stucture of crystals grown on the concave portions can be prepared by forming fine concave-convex pattern on the support by use of printing method, photography etching method, etc., and providing a stimulable layer on the support by applying preferably vapor phase build-up methods.

FIG. 3 is a cross-sectional view of an example of the storage panel which is a disclosed technique in the above-mentioned publication. In FIG. 3, the numeral 10 denotes a storage panel; 12, a support; 13, a stimulable layer; 11*ij*, a convex portion; 11*ij'*, a concave portion; 13*ij*, a fine pillar-shaped stimulable phosphor grown on the convex portion; and 13*ij'*, a fine pillar-shaped stimulable phosphor grown on the concave portion. FIG. 4(*a*), 4(*b*) and 4(*c*) are respectively plane-views of several examples of the concave-convex pattern of the support surface. Incidentally, in FIGS. 4(*a*) to 4(*c*), 21*ij* is a convex portion protruded on partitioned areas on a support 22. 21*ij'* is a concave portion corresponding to said convex portion. The success of the fine concave-convex pattern depends on the height of the convex portion and the ratio of area of the concave portion to the convex portion.

The present inventors also have further proposed in Japanese Unexamined Patent Publication No. 142498/1986, a storage panel having, on a support having a large number of fine concave-convex pattern on it surface, a stimulable layer comprising a fine pillar-shaped block structure which is grown on a convex portions of the pattern.

In the storage panel having the concave-convex pattern, scattering of the stimulating light in the stimulable layer is remarkably reduced and the sharpness of the image is enhanced. Accordingly, the technique for forming the fine concave-convex pattern on the surfaces of the above-mentioned crystallized glasses, ceramics, metals, etc. is important. However, to provide evenly a fine concave-convex pattern on a large ares is technically difficult, because each of the above methods for forming the concave-convex pattern is accompanied with complicated steps and high cost.

SUMMARY OF THE INVENTION

As mentioned above, conventional storage panels using the stimulable phosphor have problems of inferior heat-resistance of the support and planarity when the support is heated. To avoid the problems, the requirement to be opaque cannot by met, resulting in that the materials to be used as a support are limited to very small scope. Also, there has never been found an appropriate and easy method for providing fine concave-convex pattern on the support which is effective for enhancing the sharpness of images.

An object of this invention is, in view of the above-mentioned difficulties in the radiation image storage panel using the stimulable phosphor, to provide a radiation image storage panel which can give an image with high sharpness and high image quality and can be produced easily with low cost.

Another object of this invention is to provide a radiation image storage panel which retains good heat-resistance and planarity when heated, has a support comprising chemically inert substances and being opaque to the stimulating light and stimulated emission, and has an excellent radiation sensitivity, sharpness and mechanical properties.

The radiation image storage panel (hereinafter referred as "storage panel") of this invention comprises a support, a flame-sprayed layer and a stimulable phosphor layer (hereinafter referred as "stimulable layer") formed by a vapor phase build-in method in succession.

The storage panel of this invention may also be made to have a structure that the flame-sprayed layer can be separated from the support.

Further, the storage panel of this invention may be made to have a structure in which both sides of the support have the flame-sprayed layers thereon.

DESCRIPTION OF THE PREFERRED EMBODIMENTS

Figure 1:
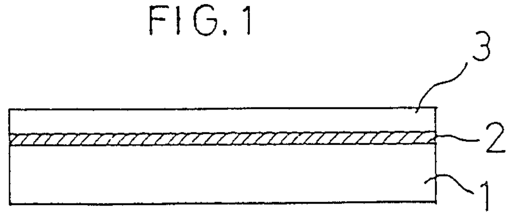
FIG. 1 and FIG. 2 are cross-sectional views of the storage panel of this invention.
Figure 2:
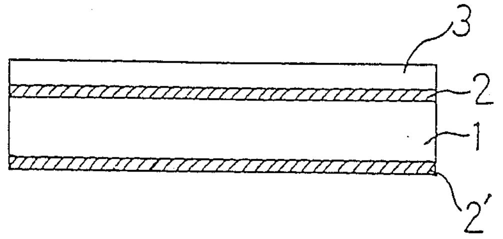
Figure 3:
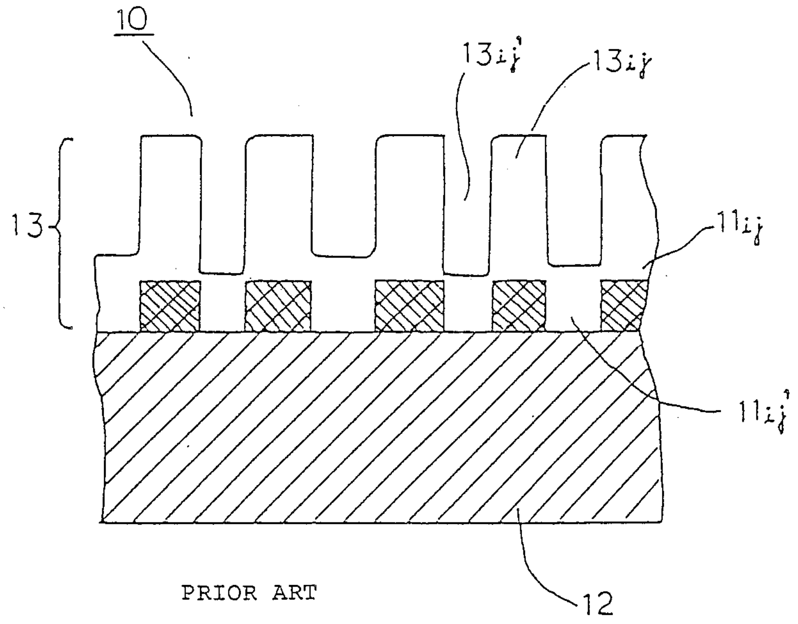
FIG. 3 is a typical cross-sectional view of fine pillar-shaped crystals grown on the convex portions of the support.
Figure 4A:
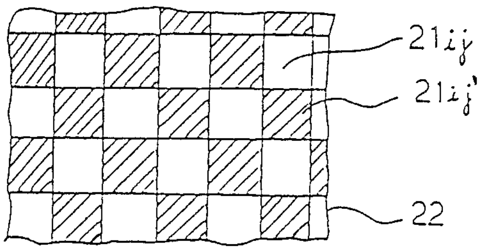
FIGS. 4(*a*), 4(*b*) and 4(*c*) are each plane views of examples of the concave-convex patterns on the support.
Figure 4B:
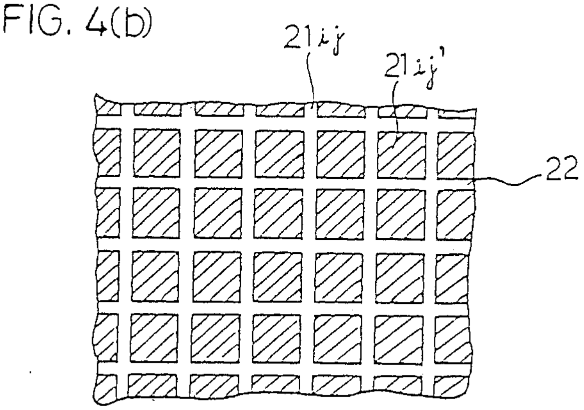
Figure 4C:
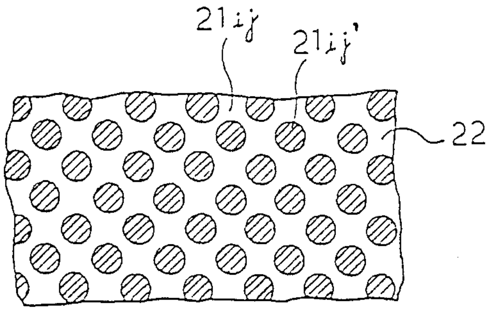

The construction of the storage panel of this invention will be described by referring the drawings. FIG. 1 and FIG. 2 are schematic cross-sectional views showing an example of the storage panel of this invention. In these drawings, the numeral 1 denotes a support, 2 and 2', flame-sprayed layer and 3, a stimulable layer, respectively.

The storage panel of this invention comprises the flame-sprayed layer 2 and the stimulable layer 3 on the support 1 in succession as shown in FIG. 1.

In the storage panel of this invention, the support 1 and the flame sprayed layer 2 may be made so that they can be separated.

Also, in the storage panel of this invention, the support may have a flame-sprayed layer 2' on the surface of the support 1 on the side opposite to the surface on which the flame-sprayed layer 2 is formed.

The storage panel of this invention may also be provided with, not shown in the drawing, a protective layer on the stimulable layer 3.

Respective constitutional elements of the storage panel of this invention will be described hereinbelow.

In the storage panel of this invention, the flame-sprayed layer formed on the support serves to provide a surface having fine concave-convex pattern which can improve sharpness of images. Further, transparent materials such as glass can be applied as a support, because the flame-sprayed layer is opaque and can scatter or block the stimulating light to inhibit transmission thereof. Also, the thickness of the layers other than the stimulable layer of the storage panel can be made thinner by making the flame-sprayed layer to be separable from the support. As a result, even if radiation is irradiated on the under side of the storage panel in FIG. 1, the sensitivity can be improved. Besides these advantages, there is the advantage that low heat-resistant materials can also be used as a support by separating the support before heat-treatment, even if the storage panel is heated by annealing of the stimulable layer and the like.

Further, by forming the flame-sprayed layers on both sides of the support, the effect of inhibiting deformation of the storage panel due to heating and the like mentioned above can be remarkably improved by the following reason. Thermal expansion coefficients of the support and the flame-sprayed layer are different each other as follows. For example, the thermal expansion coefficient of the crystallized glass used as a support is $1\times10^{-6}/°C.$; aluminum, $23\times10-6/°C.$; $Al_2O_3$ used as a material for flame-spraying, $7\times10^{-6}/°C.$; $TiO_2$, $5\times10^{-3}/°C.$; $Cr_2O_3$, $9\times10^{-6}/°C.$ Accordingly, by the heating applied during preparation of the storage panel, for example, heating during flame-spraying, heating during vapor deposition, heating during annealing after vapor deposition, warpage may sometimes occur on the storage panel due to the difference of the thermal expansion coefficients. When warpage occur as described above, images with good quality cannot be obtained, because not only the handling thereof may be disturbed, but also the distance between optical system or light-collecting system and the stimulable layer surface is not constant. Also, mechanical strength of the storage panel can be enhanced.

In this instance, the warpage due to heating can be inhibited by forming flame-sprayed layers on both sides of the support, resulting in the solution of such problems.

Such flame-sprayed layer can be formed, in any case, by the flame-spraying methods mentioned below.

The flame-spraying method is a technique in which materials for flame-spraying such as metals and ceramics are spontaneously molten at high temperature, and thus melted materials are spontaneously bombarded with high speed on the surface of subject to be treated to cover the subject. The flame-spraying methods which can be applied to this invention may include the gas-type flame-spraying method in which high temperature gas flame is used as a heat source, the electric-type flame-spraying method in which arc or plasma is used as a heat source, etc. The gas-type flame-spraying method has an advantage of which the production cost is low, and the eletric-type flame-spraying method has an advantage that films having high density and good adhesiveness can be obtained thereby.

Figure 5A:
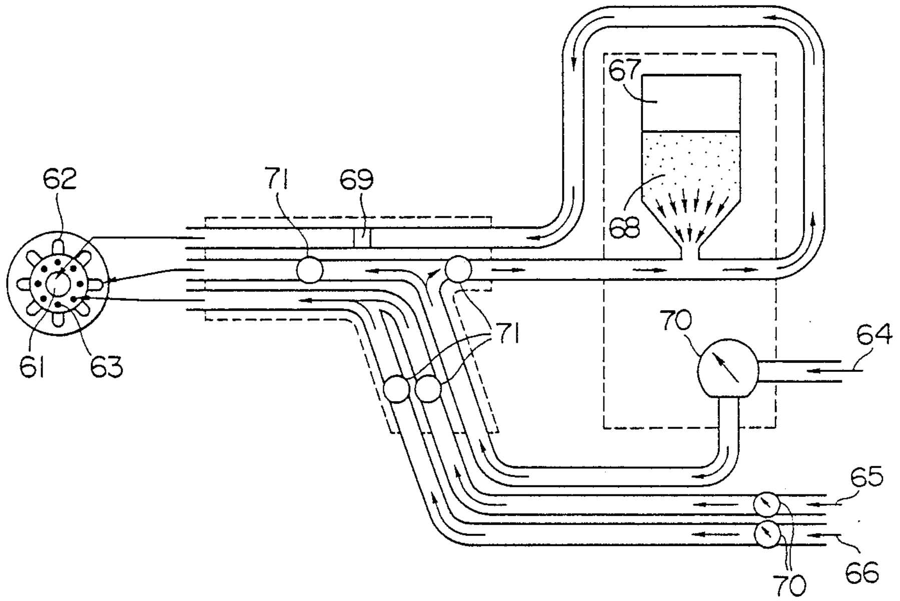
FIGS. 5(i a), 5(*b*) and 5(*c*) are each cross-sectional views of flame-spraying apparatuses to be used for the flame-spraying method.
Figure 5B:
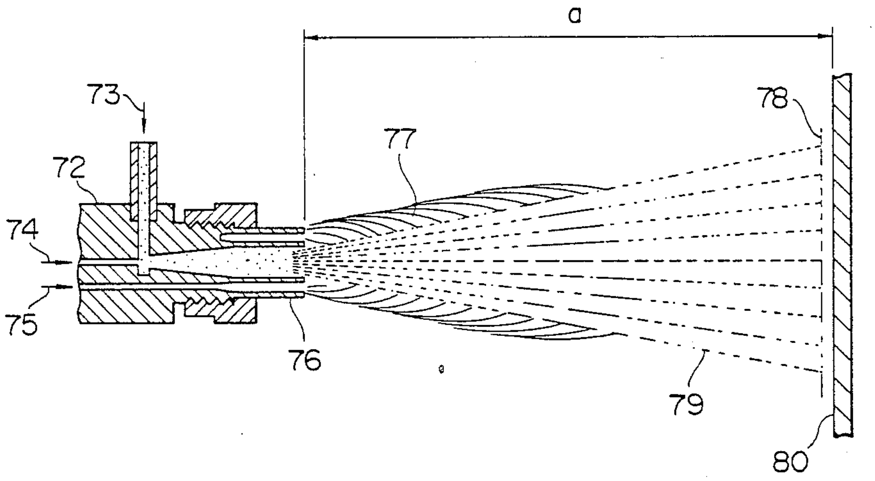
Figure 5C:
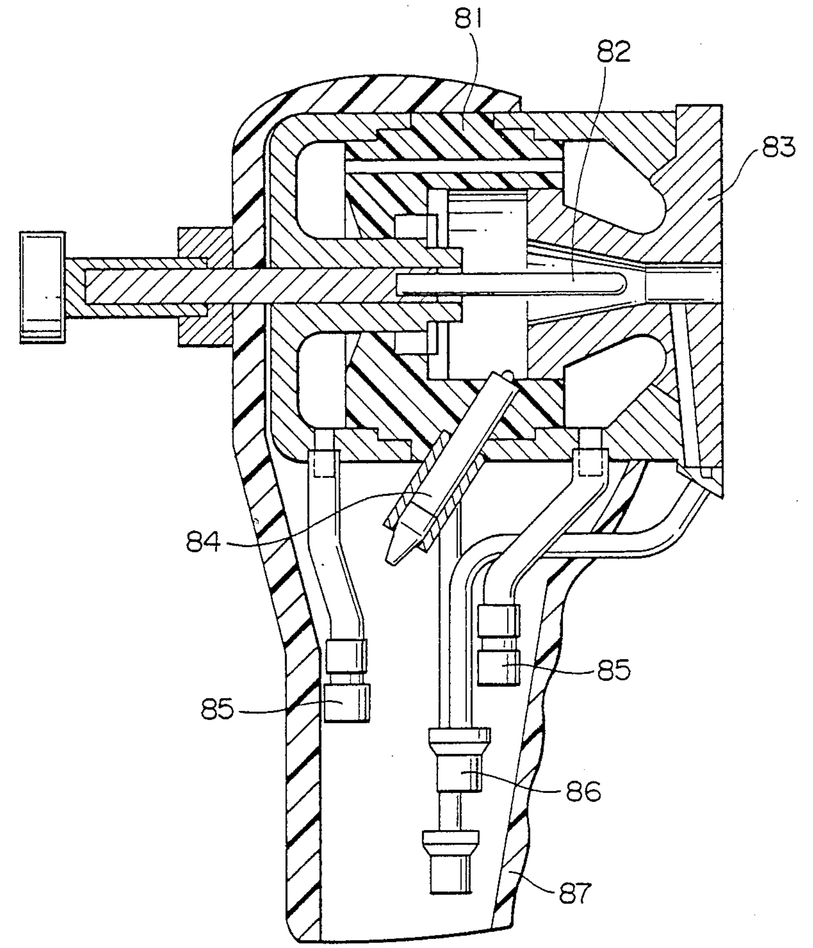

For forming the flame-sprayed layer, the flame-spraying apparatuses shown in FIGS. 5(i a) to FIG. 5(*c*) can be used. Here, FIG. 5(i a) is a schematical view of the gas-type flame-spraying apparatus. In FIG. 5(i a), the numeral 61 denotes a powder-feeding tube; 62, a cooling air-feeding tube; 63, an oxygen—acetylene-feeding tube; 64, a compressed air-feeding tube; 65, an acetylene-feeding tube; 66, an oxygen-feeding tube; 67, a hopper; 68, powder; 69, a trigger; 70, a regulator; and 71, a controlling valve. FIG. 5(*b*) is an enlarged view of a nozzle section of FIG. 5(i a). In FIG. 5(*b*), the numeral 72, denotes a gun; 73, a powder-feeding tube 74, an aspirating gas tube; 75, an oxygen—acetylene-feeding tube; 76, a nozzle; 77, combustion gas; 78, flame-sprayed film; 79, flame-sprayed particles; and 80, a support. The distance a from the nozzle to the support is about 100 to 150 mm. FIG. 5(*c*) is a schematical view of the plasma flame-spraying apparatus. In FIG. 5(*c*), the numeral 81 denotes an insulator; 82, a rod electrode; 83, a nozzle electrode; 84, a capacitor starter; 85, a connector and cooling water port; 86, a coating material feeding inlet; and 87, a grip. Specifically, flame-spraying apparatuses produced by Meteco Co., Union Carbide Co., etc. are commercially available. For example, Meteco 3MB, Meteco 7 MB, etc. can be used.

The flame-spraying conditions are not particularly limited. However, in the case of using materials with low heat-resistance as a support, the flame-spraying may preferably be conducted at a temperature so that no deformation occurs in the material.

Materials for constituting the flame-spraying layer, by no means limited so long as the flame-spraying is possible, may include, for example, alumina, titanium oxide, alumina-titania, alumina-silica, chromium oxide, alumina-zirconia, zirconia, magnesium zirconate, tungsten carbide, titanium carbide, aluminum, zinc, copper, alumin silicon, titanium nitride, etc. These may be used in combination of two or more of them.

Particle shapes of these materials for flame-spraying, which is not limitative, may include those having powdery shape, rod-like shape, etc.

The size of these materials for flame-spraying is not particularly limited. However, when powdery materials are used as a material for flame-spraying, its particle size is preferably smaller than the thickness of the flame-sprayed layer to be formed. The average particle size of the powdery materials for flame-spraying is preferably 5 to 100 μm, more preferably 5 to 50 μm, most preferably 5 to 30 μm. In the case where the average particle size of the materials for flame spraying is more than 100 μm, the flame-sprayed layer to be formed becomes excessively thick and a dense layer cannot be obtained causing problems of warpage, peeling and the like of the flame-sprayed layer. Also, in the same instance, the thickness of the flame-sprayed layer becomes irregular causing problems in that the light scattering and light inhibiting effect are lowered. Although the flame-sprayed layer may comprise two or more layers, in such case, there is no problem when the average particle size of the materials for flame-spraying constituting the layers other than the uppermost layer is out of the range mentioned above.

The flame-sprayed layer preferably has a void according to JIS (Japanese Industrial Standard) H 8200 of 10% or less. If the void is more than 10%, adhesive strength to the support becomes undesirably lower.

Also, the flame-sprayed layer preferably has a surface roughness according to JIS B 0601 of 20 μm Ra or less. If the surface roughness is more than 20 μm, a thin and even flame-sprayed layer cannot be obtained.

Further, in the case where the flame-sprayed layers are formed on the both sides of the support, any flame-sprayed layer is preferably made of the same material for flame-spraying and is preferably made to be even in thickness.

The thickness of the flame-sprayed layer, which is not particularly limited, is preferably 10 to 300 μm, further preferably 20 to 150 μm. When the thickness of the flame-sprayed layer is over 300 μm, warpage and peeling is liable to occur. When it is thinner than 10 μm, the evenness of the layer thickness is lowered.

Figure 8:
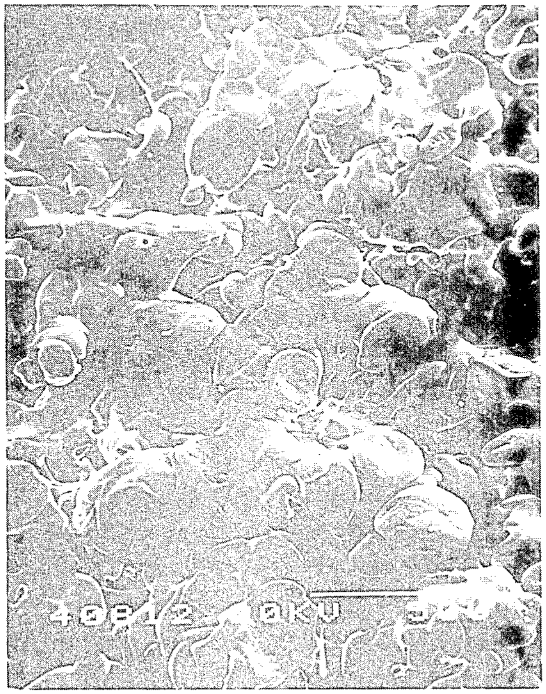
FIG. 8 is a scanning type electron microphotograph of the surface of an $Al_2O_3$—$SiO_2$ flame-sprayed layer.

FIG. 8 shows scanning type electron microphotography of the surface of the $Al_2O_3$—$SiO_2$ flame-sprayed layer. As shown in the photograph, in the flame-sprayed layer, ground particles are laminated in a stratified form to form the flame-sprayed layer.

The stimulable phosphor constituting the stimulable layer in the storage panel of this invention refers to a phosphor exhibiting stimulated emission corresponding to the dose of the first light or high energy radiation by optical, thermal, mechanical chemical or electrical stimulation (stimulating excitation) after irradiation of the first light or high energy radiation, preferably a phosphor exhibiting stimulated emission by a stimulating excitation light of 500 nm or longer. Such a stimulable phosphor may include, for example, those represented by $BaSO_4$:Ax as disclosed in Japanese Unexamined Patent Publication No. 80487/1973; those represented by $SrSO_4$:Ax as disclosed in Japanese Unexamined Patent Publication No. 80489/1973; those such as $Li_2B_4O_7$:Cu, Ag, etc. as disclosed in Japanese Unexamined Patent Publication No. 39277/1978; those such as $Li_2O\cdot(B_2O_2)x$:Cu and $Li_2O\cdot(B_2O_2)x$:Cu,Ag, etc. as disclosed in Japanese Unexamined Patent Publication No. 47883/1979; those represented by SrS:Ce,Sm, SrS:Eu,Sm, $La_2O_2S$:Eu,Sm and (Zn, Cd)S:Mn,X as disclosed in U.S. Pat. No. 3,859,527. Also, ZnS:Cu,Pb phosphors as disclosed in Japanese Unexamined Patent Publication No. 12142/1980; barium aluminate phosphors represented by the formula $BaO\cdot xAl_2O_3$ Eu and alkaline earth metallosilicate type phosphors represented by the formula $M^{II}O\cdot xSiO_2$:A.

Additional examples of phosphors may include, as disclosed in Japanese Unexamined Patent Publication No. 12143/1980, those represented by the following formula:

$$(Ba_{1-x-y}Mg_xCa_y)FX{:}Eu;$$

those as disclosed in Japanese Unexamined Patent Publication No. 12144/1980 which corresponds to U.S. Pat. No. 4,236,078:

$$LnOX{:}xA;$$

those as disclosed in Japanese Unexamined Patent Publication No. 12145/1980:

$$(Ba_{1-x}M^{II}x)FX{:}yA;$$

those as disclosed in Japanese Unexamined Patent Publication No. 84389/1980:

$$BaFX{:}xCe,yA;$$

rare-earth elements activated divalent metallic fluorohalide phosphors as disclosed in Japanese Unexamined Patent Publication No. 160078/1980:

$$M^{II}FX\cdot xA{:}yLn;$$

those represented by any of the formulas shown below:

ZnS:A, CdS:A, (Zn,Cd)S:A, ZnS:A,X and CdS:A,X;

those as disclosed in Japanese Unexamined Patent Publication No. 38278/1984:

$$xM_3(PO_4)_2\cdot NX_2{:}yA$$

$$M_3(PO_4)_2{:}yA;$$

those as disclosed in Japanese Unexamined Patent Publication No. 155487/1984, represented by any of the formulas shown below:

$$nReX_3\cdot mAX'_2{:}xEu$$

$$nReX_3\cdot mAX'_2{:}xEu,ySm;$$

alkali halide phosphors as disclosed in Japanese Unexamined Patent Publication No. 72087/1986, represented by the formula shown below:

$M^{I}X \cdot aM^{II}X'_2 \cdot bM^{III}X''_3:cA;$ and bismuth activated alkali halide phosphors disclosed in Japanese Unexamined Patent Publication No. 228400/1986 represented by the formula:

$M^{I}X:xBi$ and the like.

Particularly, alkali halide phosphors are preferable, because stimulable phosphor layers can be formed easily according to the method such as vacuum vapor deposition, sputtering, etc.

However, the stimulable phosphor to be used in the radiation image storage panel of this invention is not limited to those as described above, but any phosphor which can exhibit stimulated fluorescence when irradiated with a stimulating light after irradiation of radiation may be useful.

The stimulable layer of the storage panel of this invention may have a group of stimulable layers containing one or two or more stimulable layers comprising at least one of the stimulable phosphors as mentioned above. The stimulable phosphors to be contained in the respective stimulable phosphor layers may be either identical or different.

The stimulable layer may be formed by a vapor deposition method such as the vacuum deposition method.

In the vacuum deposition method, a support is first set in a vacuum deposition device and the device is evacuated to a vacuum degree of about $10^{-6}$ Torr. Then, at least one of the above stimulable phosphors is evaporated by heating according to the resistance heating method, the electron beam method, etc. to yield a stimulable phosphor with a desired thickness deposited on the above support surface.

As a result, a stimulable phosphor layer is formed, and it is also possible to form the stimulable phosphor layer for plural divided times in the above vapor deposition step. Also, in the above vapor deposition step, a plurality of resistance heaters or electron beams may be employed to effect co-deposition. Further, in the vapor-deposition method, the phosphor layer may be formed spontaneously with effecting co-deposition by using stimulable phosphor materials and synthesis of the desired stimulable phosphors on a support. In the above vapor deposition method, the subject on which vapor deposition is effected may be cooled or heated, if desired. Also, after completion of vapor deposition, the stimulable phosphor layer may be subjected to heating treatment.

As other vapor-phase deposition methods, the sputtering method, the CVD method, etc. can be applied.

The thickness of the stimulable layer of the storage panel of this invention, which may differ depending on the sensitivity of the radiation image storage panel to radiation, the kind of the stimulable phosphor, etc., may preferably be within the range of from 1 to 1,000 μm, more preferably from 20 to 800 μm.

The support to be used for the storage panel of this invention may be made of various kinds of polymer materials, glasses, ceramics, metals, etc.

The polymeric materials may include films made of, for example, cellulose acetate, polyesters, polyethyleneterephthalate, polyamides, polyimides, triacetate, polycarbonate, etc. The metals may include metallic sheets or metal plate made of aluminum, iron, copper, chromium, etc. or metallic sheets or metal plates having a coated film of oxides of said metals thereon. The glasses may include chemical reinforced glass, crystallized glass, etc. Also, the ceramics may include sintered plates of alumina, zirconia, etc.

The thickness of these supports, which vary depending on the quality of the support to be used, may generally be in the range of 80 μm to 3 mm, preferably, in view of ease of handling, 80 μm to 1 mm.

The surface of these supports may be smooth or, alternatively, rough surface by use of grit blasting, sandblasting, etc. for the purpose of enhancing the adhesiveness with the flame-sprayed layer. Also, there may be provided an intermediate layer between the flame-sprayed layer for enhancing the adhesiveness.

In the storage panel of this invention, a protective layer may be provided on the surface on which the stimulable layer is exposed for protecting the stimulable layer from physical or chemical stimulation. The protective layer may be formed by directly coating a coating solution on the stimulable layer as disclosed in Japanese Unexamined Patent Publication No. 42500/1984 or by adhering a previously formed layer on the stimulable layer.

Alternatively, as disclosed in Japanese Unexamined Patent Publication No. 176900/1986, there may be used a resin which is curable by radiation and/or heat, namely, radiation curable type resins.

As the protective layer, preferred are those having good transparency and capable of being formed in a sheet state. Also, the protective layer is preferably those showing high transparency in the wide wavelength range for transmitting efficiently the stimulating light and stimulated emission, preferably those having a transparency of 80% or more. As such protective layers, there may be included, for example, quartz glass, borosilicate glass, chemical reinforced glass, etc.

The plastic materials used for the protective layer may include, for example, cellulose derivatives such as cellulose acetate, nitrocellulose and ethylcellulose; or poly(methyl methacrylate), poly(vinyl butyral), poly(-vinyl formal), polycarbonate, poly(vinyl acetate), polyacrylonitrile, polymethylallyl alcohol, polymethylvinylketone, cellulose diacetate, cellulose triacetate, poly(vinyl alcohol), vinylalcohol-ethylene copolymer, polyacrylic acid, polymethacrylic acid, polyglycine, polyacrylamide, poly(vinylpyrrolidone), polyvinylamine, polyethylene terephthalate, polyethylene, poly(-vinylidene chloride), poly(vinyl chloride), polyamide (Nylon), polytetrafluoroethylene, poly(trifluorochloroethylene), polypropylene, poly(tetrafluoroethylene)-hexafluoro propylene copolymer, poly(vinyl isobutyl ether), polystyrene, etc.

The above-mentioned radiation curable type resin may include compounds having unsaturated double bond or compositions containing the compounds. Such compounds are preferably pre-polymer and/or olygomer having two or more unsaturated double bonds, and may further contain monomers such as vinyl monomers having unsaturated double bonds as a reactive diluent.

The protective layer may be formed by depositing inorganic substances such as SiC, $SiO_2$, SiN and $Al_2O_3$ by use of the vacuum vapor deposition method, the sputtering method, etc.

The protective layer may comprise two or more layers, if desired. Particularly, preferred is the construction as disclosed in Japanese Unexamined Patent Publication No. 15500/1987 in which two or more layers having regains which are different each other are combined in view of water vapor barrier property.

In the storage panel of this invention, a layer of which its reflectance is lower than that of the protective layer may be provided between the stimulable layer and the protective layer. Further, between the stimulable layer and, the above-mentioned layer having lower refractance, there may be provided a layer having higher reflectance than that of the above-mentioned low refractance layer. By using the above constructions of the protective layers, the durability and lifetime of the storage panel can preferably be enhanced without impairing sharpness of images.

The thickness of the protective layer is 10 $\mu m$ to 3 mm in practical use, preferably 100 $\mu m$ or more for obtaining good water vapor barrier property. In the case where the thickness of the protective layer is 500 $\mu m$ or more, a storage panel with excellent durability and lifetime can preferably be obtained.

The provision of a reflection preventing layer such as $MgF_2$ on the surface of the protective layer can preferably be possessed the effects such as efficient transmission of stimulating light and stimulated light as well as depression of lowering in sharpness.

The reflectance of the protective layer, which is not particularly limited, may be generally in the range of 1.4 to 2.0.

For imparting the water vapor barrier property to the storage panel of this invention, it is preferred to seal side edge portions of the protective layer(s) and the support or peripheral portions of a supporting member for the protective layer. As the method for sealing, there may preferably be applied with the sealing method by use of glass fusion, or epoxy resin type adhesives.

Figure 6A:
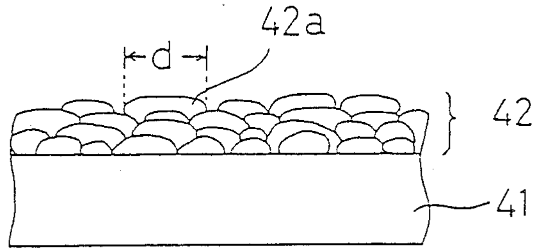
FIGS. 6(i a) and 6(*b*) are each typical views of a flame-sprayed layer and a stimulable layer formed by vapor phase build-up method on the flame-sprayed layer according to this invention.
Figure 6B:
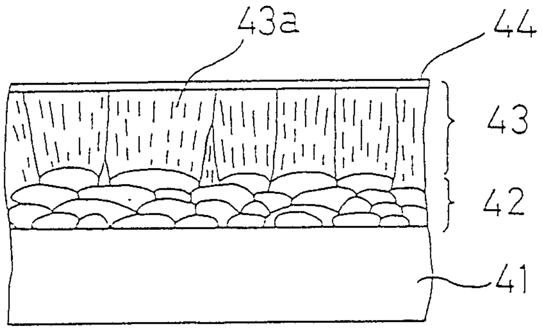

FIG. 6(i a) is a sectional view of a part of the storage panel according to this invention. In the drawing, the numeral 41 denotes a support, 42, a flame-sprayed layer and **42*a*, a convex portion of the flame-sprayed layer. A major axis d of 42*a***, which depends on whether the material to be flame-sprayed is powdery or rod-like, etc., may preferably be 5 $\mu m$ to 100 $\mu m$.

FIG. 6(*b*) is a sectional view of a part of a storage panel of this invention on which a stimulable layer 43 is provided on the flame-sprayed layer 42 mentioned above by use of the vapor phase build-up method. The numeral **43*a* denotes a fine piller-shaped block structure grown on the convex portion 42*a* on the surface of the flame-sprayed layer The numeral 44** denotes a protective layer which is preferably provided.

Figure 9:
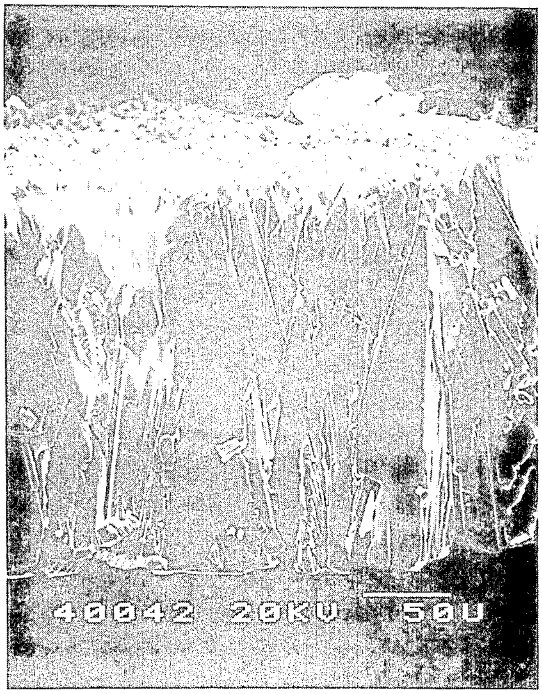
FIG. 9 is a scanning type electron microphotograph of fine pillar-shaped crystal formed by the vapor phase build-up method on the flame-sprayed layer of FIG. 8.

FIG. 9 is a scanning type electron microphotograph of a sectional part of a stimulable layer of an example of a storage panel according to this invention. In FIG. 9, the upper portion of the photograph is a support side and the lower portion is a protective layer side. As shown in FIG. 9, the stimulable layer formed on the flame-sprayed layer by use of a vapor phase build-up method has remarkably grown to pillar-shaped crystals. The pillar-shaped crystals swarm and preferentially grow around the convex portions of the flame-sprayed layer to form a structure of pillar-shaped blocks standing close together.

Figure 7:
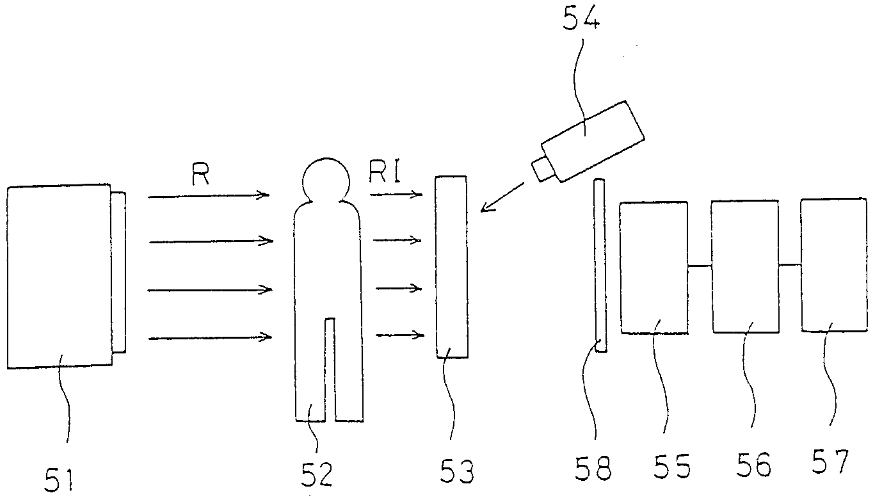
FIG. 7 is an illustrative view of a radiation image converting method.

The storage panel of this invention is used for the radiation image storage method schematically indicated in FIG. 7.

In FIG. 7, the numeral 51 denotes a radiation generator; R, radiation generated from the radiation generator; 52, a subject; RI, radiation transmitted through the subject; 53, a storage panel according to this invention; 54, a stimulating light source; 55, a photoelectric transducer to detect stimulated emission radiated from the storage panel; 56, a unit to reproduce as an image the signals detected by 55; 57, a unit to display a reproduced image; 58, a filter to separate the stimulating light and stimulated emission and to pass only the stimulated emission. The units posterior to the unit 55 may be any of those which can reproduce light information as an image in any form, and are by no means limited to the above-identified.

As shown in FIG. 7, the radiation from the radiation generator 51 is made incident on the storage panel 53 through the subject 52. This radiation thus made incident is absorbed in the phosphor layer of the storage panel 53, where its energy is accumulated and an accumulated image of the radiation-transmitted image is formed. Next, this accumulated image is excited by the stimulating light from the stimulating light source 54 and emitted as stimulated emission. The strength of the stimulated emission thus radiated is proportional to the amount of accumulated radiation energy. Accordingly, this light signal may be subjected to photoelectrical conversion by means of the photoelectric transducer 55 as exemplified by a photomultiplier tube, reproduced as an image by the image-reproducing unit 56, and may be displayed by the image display unit 57, so that the radiation-transmitted image of the subject can be viewed.

This invention will be described below by giving Examples.

EXAMPLE 1

A support, crystallized glass plate of 1 mm thick, was subjected to sandblasting treatment. Onto the plate, flame-sprayed was 99% $Al_2O_3$ powders with an average particle diameter of 30 $\mu m$, a minimum particle diameter of 5 $\mu m$ and a maximum particle diameter of 50 $\mu m$ by use of the apparatus shown in FIG. 5(i a) to form a flame-sprayed layer having a thickness of about 70 $\mu m$.

Next, the flame-sprayed layer was subjected to deposition of rubidium bromide stimulable phosphor ($RbBr{:}1\times10^{-4}Tl$) by use of the resistance heating method to a thickness of about 300 $\mu m$ to obtain a storage panel of this invention.

A scanning type electron microphotography of a sectional part of the storage panel is shown in FIG. 9. Also, a modification transmission function (MTF) of the image obtained by use of this storage panel was measured. An excellent sharpness value of 40% at a spatial frequency of 2 cycles/mm was observed.

EXAMPLE 2

On the polyethylene terephthalate (PET) plate of 100 $\mu m$ thick, 99% of $Al_2O_3$ powders used in Example 1 were flame-sprayed by use of the flame-spraying apparatus shown in FIG. 5(a) to form a flame-sprayed layer of about 70 $\mu m$ thick.

Figure 10:
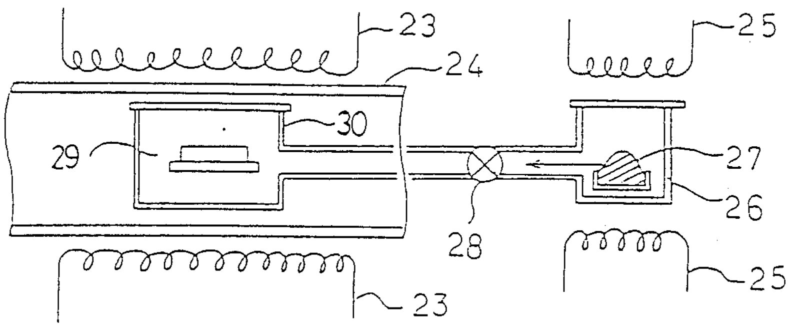
FIG. 10 is a schematic view of a heat-treatment vessel.

Next, the flame-sprayed layer was subjected to deposition of rubidium bromide stimulable phosphor ($RbBr{:}1\times10^{-4}Tl$) by use of the resistance heating method to a thickness of about 300 $\mu m$ to obtain a storage. panel of this invention, followed by separation of PET from the flame-sprayed layer. Then, the storage panel having the stimulable layer on the flame-sprayed layer thereof was subjected to heat treatment in the heat treatment vessel shown in FIG. 10 in an atmosphere of TlBr vapor in an amount so that the TlBr concentration is $10^{-4}$ mol at 500 ° C. for 4 hours to obtain a storage panel of this invention. In FIG. 10, the numeral 23 denotes a heating means; 24, a reactive tube; 25, a heating means; 26, an evaporation vessel; 27, powdery material containing an activator; 28, a valve for controlling gas amount; 29, a storage panel; and 30, a heat treatment vessel.

COMPARATIVE EXAMPLE 1

A flame-sprayed layer and a stimulable layer were formed on a polyethylene terephthalate plate in the same manner as in Example 2 and the same heat treatment was applied thereto without separating the PET plate. As a result, PET was deformed during the doping and thus the desired panel could not be obtained.

COMPARATIVE EXAMPLE 2

The same procedure as in Example 2 was repeated except that a crystallized glass of 1 mm thick was used as a support and no separation step of the support from the flame-sprayed layer was made to obtain a storage panel. Comparison of the radiation sensitivities of this storage panel and the storage panel of Example 2 was made and it was found that the sensitivity of the panel of this comparative example was similar to that of the panel of Example 2 when radiation was irradiated on the panel from the side of the stimulable layer. However, the sensitivity of the panel of Example 2 was higher by about 17% when irradiated from the side of the support.

EXAMPLE 3

A crystallized glass plate with size of 350 mm×425 mm and thickness of 1 mm was subjected to the sandblasting treatment on both faces. The treated faces were formed with flame-sprayed layers of about 50 μm thick by using the apparatus as shown in FIG. 5(a) by use of 99% $Al_2O_3$ used in Example 1.

Next, on one layer of the flame-sprayed layer, rubidium bromide phosphor ($RbBr{:}1\times10^{-4}Tl$) was deposited by the electron beam deposition method to a thickness of about 300 μm. Further, the deposited panel was subjected to heat treatment in the heat treatment vessel as in Example 2 while introducing TlBr vapor so that the TlBr concentration becomes $1\times10^{-4}$ mol at 500° C. for 4 hours.

Similarly, 20 pieces of the storage panel of this invention were obtained in total.

EXAMPLE 4

Both faces of a crystallized glass of 1 mm thick were subjected to the sandblasting treatment and the both faces of the thus treated glass were flame-sprayed with $Al_2O_3$·40%$TiO_2$ by use of Rokide Rod spray apparatus form a flame-sprayed layer of about 40 μm thick.

Next, on the above flame-sprayed layer formed on the both faces, 99% $Al_2O_3$ powders used in Example 1 were flame-sprayed to further form a flame-sprayed layer of 50 μm thick. Then, a stimulable layer was formed on only one face of the flame-sprayed layers in the same manner as in example 3.

Similarly, 20 pieces of the storage panels of this invention were obtained in total.

EXAMPLE 5

Both faces of a crystallized glass of 1 mm thick were subjected to the sandblasting treatment and one face was flame-sprayed with $Al_2O_3$·40%$TiO_2$ by use of Rokide Rod spray apparatus to form a flame-sprayed layer of about 40 μm thick.

Next, on another face of the glass opposite thereto, $Al_2O_3$·40% $TiO_2$ powders were flame-sprayed to form a flame-sprayed layer of 90 μm thick. Then, 99%$Al_2O_3$ powders used in Example 1 were flame-sprayed by use of the apparatus shown in fIG. 5(a) onto the flame-sprayed layer of 40 μm thick previously formed to form a flame-sprayed layer of about 50 μm thick. Next, on the flame-sprayed layer, a simulable layer was formed in the same manner as in Example 3.

Similarly, 20 pieces of the storage panels of this invention were obtained in total.

EXAMPLE 3A

Example 3 was repeated except that no flame-sprayed layer was formed on the support surface oppósite to the face on which the stimulable layer was formed in Example 4 to obtain 20 pieces of the storage panels in total.

EXAMPLE 4A

Example 4 was repeated except that no flame-sprayed layer was formed on the support surface opposite to the face on which the stimulable layer was formed in Example 4 to obtain 20 pieces of the storage panels in total.

The warpage of supports of respective storage panels of Examples 3 to 5 and Examples 3A and 4A mentioned above were measured in the following manner.

First, respective storage panels were mounted on a surface plate whose the surface was a vertical face, with the face of the storage panel upward. Next, spacings between the surface plate with four corners of the support face being in contact with the surface plate were measured by 0.1 mm unit without applying power from the outside. This measurement was effected to each 20 pieces of the storage panels. The average warpage value and standard deviation thereof are shown in Table 1.

Also, sensitivity and sharpness of each storage panel was measured in the following manner.

First, respective panels were exposed to 10 mR of X-rays having a tube voltage of 80 KVp, and thereafter subjected to stimulating excitation using a semiconductor laser beam (780 nm), where the stimulated emission radiated from the phosphor layer was subjected to photoelectric conversion with use of a photoconductor (a photomultiplier tube), and the resulting signals were reproduced as an image by use of an image-reproducing unit, which was then analyzed. The sensitivity of the storage panel was examined from the size of the signals and MTF of the images was examined from the images obtained to obtain the results as shown in Table 1. In Table 1, the sensitivity to X-rays is indicated as a relative value assuming that of the storage panel of Example 3 as 100. The MTF value was a value at a spacial frequency of 2 cycles/mm.

TABLE 1

| | Example 3 | Example 4 | Example 5 | Example 3A | Example 4A |
|---|---|---|---|---|---|
| Average of warpage | 0.13 | 0.19 | 0.38 | 1.07 | 1.91 |

TABLE 1-continued

| | Example 3 | Example 4 | Example 5 | Example 3A | Example 4A |
|---|---|---|---|---|---|
| (mm) | | | | | |
| Standard deviation of warpage (mm) | 0.15 | 0.11 | 0.14 | 0.59 | 0.67 |
| Average of sensitivity | 100 | 80 | 82 | 101 | 82 |
| Average of sharpness | 39 | 48 | 47 | 37 | 47 |

As will be clear from Table 1, the storage panels of Examples 3 to 5 showed little warpage and thus had superior planness as compared with the storage panels of Examples 3A and 4A.

Also, as will be understood from the comparison between Example 3 with Example 3A and the comparison between Examples 4 and 5 with Example 4A, when the structures of the flame-sprayed layer under the stimulable layer of them are same each other, the properties such as sensitivity and sharpness are mostly the same even if the flame-sprayed layer is further provided on the back face of the support.

EXAMPLE 6

Both faces of a crystallized glass plate with a size of 200 mm×250 mm were subjected to the sandbrasting treatment, then one face of these faces was flame-sprayed with $Al_2O_3$·40%$TiO_2$ by use of Lokide Rod spray apparatus to form a flame-sprayed layer of about 40 μm thick. On the flame-sprayed layer, 99% $Al_2O_3$ powders with an average particle diameter of 10 μm, a minimum particle diameter of 5 μm and a maximum particle diameter of 20 μm were flame-sprayed by use of a gas flame-spraying apparatus to form a flame-sprayed layer.

Next, alkali halide phosphor (RbBr:1×$10^{-4}$Tl) was vapor deposited on the flame-sprayed layer by the electron beam vapor deposition method to a thickness of about 300 μm to obtain a storage panel of this invention.

COMPARATIVE EXAMPLE 5

Example 6 wsa repeated providing that 99% $Al_2O_3$ powders with an average particle diameter of 70 μm, a minimum particle diameter of 15 μm and a maximum particle diameter of 110 μm were used as the material for $Al_2O_3$ flame-spraying to obtain the storage panel of this invention.

COMPARATIVE EXAMPLE 6

Example 6 was repeated providing that 99% $Al_2O_3$ powders with an average particle diameter of 70 μm, a minimum particle diameter of 15 μm and a maximum particle diameter of 110 μm were used as the material for $Al_2O_3$ flame-spraying and adjusting the thickness of the $Al_2O_3$ flame-sprayed layer to about 120 μm to obtain the storage panel of this invention.

The warpage of the support of the storage panels of Exampel 6 and Comparative examples 6 and 7 and the sensitivity and sharpness of the panels were measured in the same manner as in Examples 3 to 5. Further, reproduced images showing the distribution of the radiation sensitivity were observed and estimated with eye to search for the presence of spot-like irregular which are considered to be caused by irregularities in the thickness of the flame-sprayed layer. The results are shown in Table 2.

TABLE 2

| | Example 6 | Comp. exa. 5 | Comp. exa. 6 |
|---|---|---|---|
| Warpage (mm) | 0.48 | 0.43 | 1.08 |
| Sensitivity | 100 | 65 | 104 |
| Sharpness (%) | 45 | 50 | 33 |
| Spot-like irregular | None | Present | None |

As will be clear from Table 2, the storage panel of Example 6 showed excellent sensitivity and sharpness without warpage and spot-like irregularities, because the average particle diameter of $Al_2O_3$ powders used as the flame-sprayed material was as small as 10 μm and, accordingly, even a relatively thin flame-sprayed layer could be formed densely and regularly and showed with good effects as a light-scatterring layer.

On the other hand, the storage panel of Comparative example 5 is inferior to the storage panel of Example 6 in sensitivity. The reason is that the average particle diameter of $Al_2O_3$ powder was as large as 70 μm and, accordingly, the flame-sprayed layer contained a large number of voids and did not sufficiently function as the light-scattering layer. Also, this storage panel had a large number of spot-like irregulars, because the particle diameter of the materials for flame-spraying was large as compared with the thickness of the flame-sprayed layer to cause irregularity in the layer thickness.

Further, the storage panel of Comparative example 6 had a sensitivity similar to that of the storage panel of Example 6, because the thickness of the flame-sprayed layer of $Al_2O_3$ powder was thickened. However, the extent of the stimulated emission in the flame-sprayed layer of Comparative example 6 was extended to cause lowering of sharpness. Also, warpage due to the difference of thermal expansion efficiency between the support and the flame-sprayed layer was very large.

The effects of this invention will be described below.

(1) In the storage panel of this invention, the stimulable layer has the fine pillar-shaped block structure which was preferentially grown on the convex portions of the concave-convex pattern on the surface of the flame-sprayed layer to remarkably reduce the scattering of the stimulated emission in the stimulable layer. Accordingly, the sharpness of the images can be improved without lowering the radiation sensitivity and the graininess of the images.

The support having the flame-sprayed layer formed according to the flame-spraying method can be easily prepared evenly over a large area and, accordingly, its production cost is low, resulting in excellent productivity. Further, the support is excellent in heat-resistance, strong in the necessary mechanical properties and chemically stable, and thus appropriate to support of the storage panel.

Also, the flame-sprayed layer formed according to the flame-spraying method can be colored to white, gray, deep blue and black, and, accordingly, the flame-sprayed layer can function as a light-reflective layer, a light-scattering layer or a light-absorption layer.

(2) The storage panel of this invention can be made to have a construction in which the support and the flame-sprayed layer can be separated. In this case, besides the effects of the above (1), the storage panel has excellent effects in that its radiation sensitivity can be improved because the thickness of the portions other than the stimulable layer of the storage panel, and that, even if low heat resistance meterials such as PET are used, the storage panel can be subjected to treatments at high temperature during annealing and doping of an activator because the support can be separated.

(3) The storage panel of this invention can be made to have a construction having a flame-sprayed layer on both faces of the support. In this instance, beside the effects of the above (1), the storage panel has excellent effects, for example, in that warpage of the support due to heating applied during preparation of the storage panel can be remarkably suppressed and in that the mechanical properties of the support can be improved.

(4) In the storage panel of this invention, the flame-sprayed layer can be formed with an even thickness. The layer can be made thin and dense by making the average particle diameter of the flame-sprayed material forming the flame-sprayed layer smaller than those of convnetional ones.

We claim:

1. A radiation image storage panel, which comprises a support, a flame-sprayed layer and a stimulable phosphor layer formed by a vapor phase build-up method in succession;

said flame sprayed layer being formed of material having an average particle size of 5 to 30 μm and a void according to JIS (Japanese Industrial Standard) H 8200 of 10% or less.

2. A radiation image storage panel which comprises a support, a flame-sprayed layer and a stimulable phosphor layer formed by a vapor phase build-up method in succession and wherein the flame-sprayed layer can be separated from the support.

3. The radiation image storage panel according to claim 1, wherein the panel further comprises a protective layer on the stimulable layer.

4. The radiation image storage panel according to claim 1, wherein the stimulable phosphor layer has a fine pillar-shaped block construction.

5. The radiation image storage panel according to claim 1, wherein the flame-sprayed layer is opaque.

6. The radiation image storage panel according to claim 1, wherein the flame-sprayed layer is constituted of at least one of alumina, titanium oxide, alumina-titania, alumina-silica, chromium oxide, alumina-zirconia, zirconia, magnesium zirconate, tungsten carbide, titanium carbide, aluminum, zinc, copper, alumin silicon and titanium nitride.

7. The radiation image storage panel according to claim 2, wherein the material for forming the flame-sprayed layer is powdery shape having an average particle diameter of 5 to 100 μm.

8. The radiation image storage panel according to claim 1, wherein the flame-sprayed layer has a surface roughness according to JIS (Japanese Industrial Standard) B 0601 of 20 μmRa or less.

9. The radiation image storage panel according to claim 1, wherein the material for forming the flame-sprayed layer is rod-like in shape.

10. The radiation image storage panel according to claim 1, wherein the thickness of the flame-sprayed layer is 10 to 300 μm.

11. The radiation image storage panel according to claim 1, wherein the panel further comprises a flame-sprayed layer on the surface of the support opposite to the surface on which the flame-sprayed layer and the stimulable phosphor layer are provided.

12. A method for forming a radiation image storage panel which comprises forming a flame-sprayed layer by a flame-spraying method on a support and forming a stimulable phosphor layer on the flame-sprayed layer in succession;

said flame-sprayed layer being formed of material having an average particle size of 5 to 30 μm and a void according to JIS Standard (Japanese Industrial Standard) H 8200 of 10% or less.

* * * * *